(12) United States Patent
Bolt et al.

(10) Patent No.: US 7,333,455 B1
(45) Date of Patent: Feb. 19, 2008

(54) MULTIPLE INPUT MULTIPLE OUTPUT (MIMO) WIRELESS COMMUNICATIONS SYSTEM

(75) Inventors: Philip A. Bolt, Stoke Gabriel (GB); Timothy G. Wild, Totnes (GB); Gregor R. Dean, Seaton (GB); Paul Clark, Paignton (GB); Peter N. Strong, Newton Abbot (GB); Richard A. Carter, Paignton (GB); Antony C. Holmes, Torquay (GB); Colin H. V. Spier, Exeter (GB); Nigel J. R. King, South Brent (GB)

(73) Assignee: Piping Hot Networks Ltd, Ashburton (GB)

( * ) Notice: Subject to any disclaimer, the term of this patent is extended or adjusted under 35 U.S.C. 154(b) by 458 days.

(21) Appl. No.: 11/115,943

(22) Filed: Apr. 27, 2005

Related U.S. Application Data

(60) Provisional application No. 60/565,611, filed on Apr. 27, 2004.

(51) Int. Cl.
*H04Q 7/00* (2006.01)
(52) U.S. Cl. ............... 370/334; 370/329; 375/267
(58) Field of Classification Search ............. 370/334, 370/329; 455/313; 375/267
See application file for complete search history.

(56) References Cited

U.S. PATENT DOCUMENTS

| 6,321,075 | B1 | 11/2001 | Butterfield | 455/313 |
|---|---|---|---|---|
| 6,738,599 | B2 | 5/2004 | Black et al. | 455/62 |
| 6,870,515 | B2 | 3/2005 | Kitchener et al. | 343/853 |
| 2005/0053169 | A1* | 3/2005 | Jia et al. | 375/267 |
| 2005/0094598 | A1* | 5/2005 | Medvedev et al. | 370/329 |

OTHER PUBLICATIONS

"A Simple Transmit Diversity Technique for Wireless Communications"; Siavash M. Alamouti; IEEE Oct. 1998.
"The ITU-R and Radiowave Propagation"; D. G. Cole, IPS Radio & Space Services and C. D. Wilson, Telecommunication and Industrial Physics; undated.

* cited by examiner

*Primary Examiner*—Joseph Feild
*Assistant Examiner*—Phuoc Doan

(57) ABSTRACT

A wireless broadband communications system that can transmit signals over communications links with multiple modes of diversity, thereby allowing signals having very low correlation to propagate over the link along multiple orthogonal paths. The system can be implemented as a non-line-of-sight (NLOS) system or a line-of-sight (LOS) system. The NLOS system employs orthogonal frequency division modulation (OFDM) waveforms to reduce multipath interference and frequency selective fading, adaptive modulation to assure high data rates in the presence of channel variability, and spectrum management to achieve increased data throughput and link availability. The LOS system employs space-time coding and spatial and polarization diversity to minimize ground bounce nulls. The system achieves levels of link availability, data throughput, and system performance that have heretofore been unattainable in wireless broadband communications systems.

24 Claims, 13 Drawing Sheets two vectors sum of the vectors

MULTIPLE INPUT MULTIPLE OUTPUT (MIMO) WIRELESS COMMUNICATIONS SYSTEM

CROSS REFERENCE TO RELATED APPLICATIONS

This application claims priority of U.S. Provisional Patent Application No. 60/565,611 filed Apr. 27, 2004 entitled WIRELESS COMMUNICATION SYSTEM AND METHOD.

STATEMENT REGARDING FEDERALLY SPONSORED RESEARCH OR DEVELOPMENT

N/a

BACKGROUND OF THE INVENTION

The present invention relates generally to wireless communications systems, and more specifically to a low-cost high performance multiple input multiple output (MIMO) wireless broadband communications system.

In recent years, there has been an increasing need for wireless communications systems capable of carrying broadband data. Such a need has arisen for a variety of reasons, including the difficulties that users often experience in obtaining high speed Internet access service in some remote areas, and the convenience that wireless systems generally afford to users wishing to set up communications links and networks accessible from locations within urban environments or from locations dispersed across significant geographical distances.

Initial attempts at providing wireless broadband services in point-to-point and point-to-multipoint applications have included deploying line-of-sight (LOS) wireless communications systems, in which a directional antenna is typically installed at one or more user locations within the line-of-sight of an antenna at a base station. Such LOS wireless communications systems have drawbacks, however, including the high cost of system installation. For example, whether or not a prospective user location has an unimpeded view to the base station can often be determined only after an installer has been dispatched to the site. For this reason, a successful installation is not always assured after one visit of the installer and may require multiple installer visits, thereby increasing costs. In addition, in the event the location of the base station changes, the directional antenna at the user location must normally be re-aimed at the new base station location, resulting in increased costs.

Such drawbacks of conventional LOS systems have given impetus to the development of non-line-of-sight (NLOS) wireless broadband communications systems such as multiple input multiple output (MIMO) wireless communications systems. For example, a MIMO wireless communications system typically includes a plurality of antennas at a transmitter location and a plurality of antennas at a receiver location. The transmitters typically transmit signals using known space-time coding and modulation techniques. Further, one or more receivers capture the transmitted signals, and employ signal processing techniques to decode and demodulate the signals to recover user data. The multiple antennas of the MIMO system can be deployed in an environment that includes numerous scattering objects such as buildings, trees, hills, automobiles, etc. The transmitted signals undergo multi-path propagation between the transmitters and the receivers while being scattered by the various objects within the environment. Such a multi-path environment allows multiple paths to be established between the transmitters and the receivers. By transmitting user data in parallel over these multiple paths, both increased data rates and higher spectral efficiencies can be achieved.

Conventional NLOS wireless communications systems also have drawbacks, however, in that they have generally been unable to provide the high levels of link availability, data throughput, and system performance that users of broadband services demand. This is because, in general, issues such as signal attenuation, signal fading, and channel dispersion have not been satisfactorily addressed in conventional NLOS wireless systems.

It would therefore be desirable to have a low-cost high performance wireless broadband communications system that avoids the drawbacks of the above-described conventional wireless communications systems.

BRIEF SUMMARY OF THE INVENTION

In accordance with the present invention, a reduced cost, high performance, wireless broadband communications system is provided. The presently disclosed wireless broadband communications system is a multiple input multiple output (MIMO) system including a plurality of transceivers and a plurality of antennas. In the preferred embodiment, the MIMO wireless communications system is a 2:2 MIMO system comprising two antennas disposed at each end of a communications link. The 2:2 MIMO system can be implemented as a non-line-of-sight (NLOS) system or a line-of-sight (LOS) system. In the event the 2:2 MIMO system is implemented as a NLOS system, the communications link can be deployed in a high scattering environment, for example, an urban environment including numerous scattering objects and obstructions such as buildings, trees, hills, and/or automobiles. In this embodiment, the NLOS system is configured to transmit signals propagating along four signal paths between the respective ends of the link. The transmitted signals undergo multi-path propagation while being scattered by the various objects within the environment. In the event the 2:2 MIMO system is implemented as a LOS system, the link can be deployed in a reduced scattering environment such as a suburban or rural location. In this embodiment, the two antennas disposed at each end of the link are configured to transmit signals propagating along two signal paths.

The presently disclosed NLOS wireless communications system employs a combination of space-time coding and multiple diversity techniques to achieve increased de-correlation of the multiple signal paths. For example, the two antennas disposed at each end of the communications link can employ horizontal and vertical polarization, respectively, to provide polarization diversity. Further, each transceiver at the respective ends of the link can be configured to transmit at least one signal via a first antenna and a delayed version of the signal via a second antenna to provide delay diversity. Moreover, the two antennas disposed at each end of the link can have a predetermined spacing to provide spatial diversity. The two antennas at each end of the link can also be implemented as a single dual polarized antenna, thereby achieving polarization diversity while reducing space requirements.

The presently disclosed LOS wireless communications system includes a single dual polarized antenna disposed at one end of the communications link, and two vertically separated and horizontally and vertically polarized antennas disposed at the other end of the link, thereby providing polarization and spatial diversity. The LOS system employs a combination of space-time coding and spatial/polarization diversity techniques to minimize water and ground bounce nulls. By employing space-time coding and multiple modes of diversity in the presently disclosed NLOS and LOS systems, de-correlation of the signal paths is increased, and the effectiveness of space-time coding for increasing the gain in the received signal strength and for reducing signal fading is enhanced.

Because the presently disclosed NLOS and LOS wireless communications systems include multiple transceivers and antennas operative to transmit and receive signals over communications links with multiple modes of signal diversity, the systems can transmit and receive signals having very low correlation over multiple orthogonal paths. In the NLOS system, multiple carriers are employed in an orthogonal frequency division modulation (OFDM) waveform to transmit the signals over multiple orthogonal channels. Because the carriers in the OFDM waveform are orthogonal to each other, multi-path interference and frequency selective fading are reduced. Further, because the fading of the transmitted signals is de-correlated, the system gain across the multiple orthogonal channels is increased. The NLOS system can also be configured to implement an adaptive modulation technique to achieve increased data rates, and a spectrum management technique to achieve increased data throughput and link availability.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

U.S. Provisional Patent Application No. 60/565,611 filed Apr. 27, 2004 entitled WIRELESS COMMUNICATION SYSTEM AND METHOD is incorporated herein by reference.

A reduced cost, high performance, wireless broadband communications system is disclosed that can transmit signals over a communications link with multiple modes of diversity, thereby allowing signals having very low correlation to propagate over the link along multiple orthogonal paths. Because the multiple signal paths are de-correlated, the wireless communications system can more effectively apply space-time coding techniques for increasing data rates and spectral efficiencies. The presently disclosed wireless communications system can be implemented as a non-line-of-sight (NLOS) system or a line-of-sight (LOS) system. In the NLOS system, orthogonal frequency division modulation (OFDM) waveforms are employed to transmit signals over multiple orthogonal channels, thereby reducing multi-path interference and frequency selective fading. The NLOS system can also be configured to implement an adaptive modulation technique to achieve high data rates in the presence of channel variability, and a spectrum management technique to achieve increased data throughput and link availability. The spectrum management technique also facilitates system installation. In the LOS system, space-time coding and spatial and polarization diversity techniques are employed to minimize water and ground bounce nulls. The presently disclosed wireless communications system provides levels of data throughput, link availability, and system performance that have heretofore been unattainable in wireless broadband communications systems.

Figure 1:
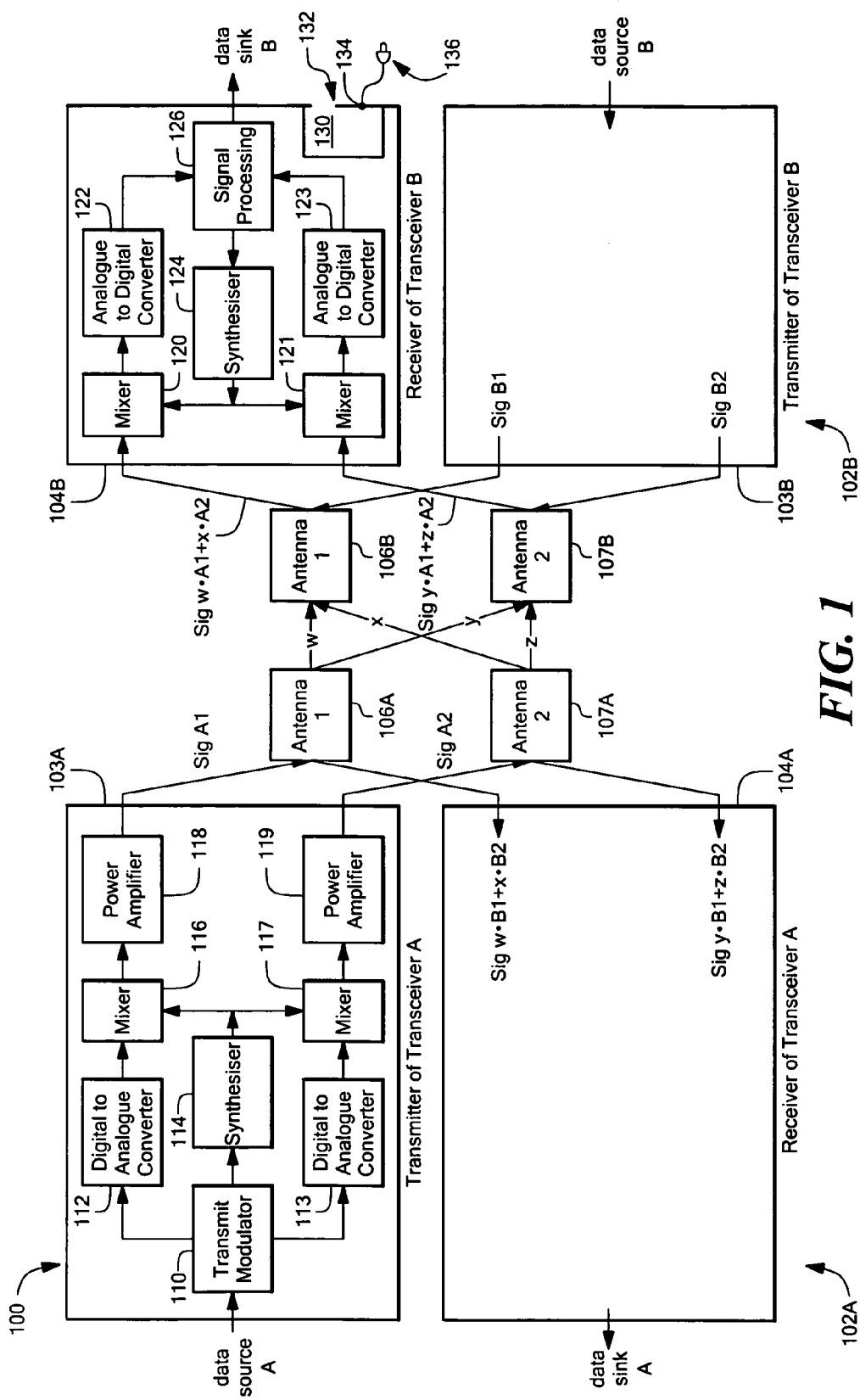
FIG. 1 is a block diagram of an illustrative embodiment of a 2:2 multiple input multiple output (MIMO) wireless broadband communications system according to the present invention.

FIG. 1 depicts an illustrative embodiment of a wireless broadband communications system 100 operative in accordance with the present invention. In the illustrated embodiment, the wireless communications system 100 is a multiple input multiple output (MIMO) system including a plurality of transceivers 102A-102B and a plurality of high gain antennas 106A-107A, 106B-107B. Specifically, the MIMO system 100 is a 2:2 MIMO system, in which the two antennas 106A-107A and the two antennas 106B-107B are located at opposite ends of a communications link (not numbered). It should be understood that the MIMO system 100 may alternatively be implemented as a 2:4, 2:n, n:n, or any other suitable type of MIMO system. The wireless communications system 100 is depicted in FIG. 1 as a 2:2 MIMO system for purposes of illustration.

As shown in FIG. 1, the 2:2 MIMO system 100 includes the transceiver 102A operatively connected to the antennas 106A-107A at one end of the communications link, and the transceiver 102B operatively connected to the antennas 106B-107B at the other end of the link. In the event the 2:2 MIMO system 100 is implemented as a NLOS system, the link can be deployed in a high scattering environment, e.g., an urban environment including numerous scattering objects and obstructions such as buildings, trees, hills, and/or automobiles. In the presently disclosed NLOS system, the antennas 106A-107A, 106B-107B are operative to transmit/receive signals propagating along four signal paths w, x, y, z between the respective ends of the link. The transmitted signals propagate along the four paths w, x, y, z while being scattered by the various objects within the environment. In the event the 2:2 MIMO system 100 is implemented as a LOS system, the link can be deployed in a reduced scattering environment such as a suburban or rural location. In the presently disclosed LOS system, the antennas 106A-107A, 106B-107B are operative to transmit/receive signals propagating along the two signal paths w, z between the respective ends of the link.

The transceiver 102A includes a transmitter 103A and a low noise receiver 104A, and the transceiver 102B includes a transmitter 103B and a low noise receiver 104B. The transmitter 103A includes the following functional components: a transmit modulator 110, digital-to-analog (D-to-A) converters 112-113, a frequency synthesizer 114, mixers 116-117, and high power amplifiers 118-119. It is understood that the transmitter 103B can include the same functional components as the transmitter 103A. FIG. 1 depicts the functional components of the transmitter 103A for clarity of illustration. Specifically, a data source A provides user data to the transmit modulator 110, which provides modulated data outputs to the D-to-A converters 112-113 and controls the operation of the synthesizer 114. The D-to-A converters 112-113 convert the transmit modulator outputs to analog signals, and provide the analog signals to the mixers 116-117. Next, the synthesizer 114 provides suitable synthesized carriers to the mixers 116-117, which mix up the analog signals to radio frequency (RF). The power amplifiers 118-119 then amplify the RF signals, and provide the amplified signals to the antennas 106A-107A for subsequent transmission over the communications link.

The receiver 104B includes the following functional components: mixers 120-121, analog-to-digital (A-to-D) converters 122-123, a frequency synthesizer 124, and a signal processor 126. The receiver 104B further includes an audio tone generator 130 for use in system installation. It is understood that the receiver 104A can include the same functional components as the receiver 104B. FIG. 1 depicts the functional components of the receiver 104B for clarity of illustration. Specifically, the RF signals received by the antennas 106B-107B are provided to the mixers 120-121, respectively, which mix the RF signals to analog baseband signals using suitable synthesized frequencies generated by the synthesizer 124. Next, the A-to-D converters 122-123 convert the analog baseband signals to digital baseband signals. The signal processor 126 then processes (e.g., decodes and demodulates) the digital signals to recover the user data, which is subsequently provided to a data sink B. The signal processor 126 also controls the operation of the synthesizer 124. In one embodiment, the signal processor 126 operates as a maximum ratio combiner (also known as an optimum combiner), which combines the signals by conceptually rotating the phase of each signal to be in alignment, and then adjusting the amplitude of each signal to maximize the combined signal-to-noise ratio.

It is noted that the data sources A-B and the data sinks A-B may comprise respective connections to one or more local area networks (LANs) or routers. Alternatively, the data sources A-B and the data sinks A-B may comprise direct connections to respective user computers. In addition, each one of the transceivers 102A-102B may be implemented as a software-defined radio. For example, the transmit modulator 110 included in each transmitter 103A-103B may employ channel modulation waveforms that are defined in software, and the signal processor 126 included in each receiver 104A-104B may demodulate the channel waveforms using demodulation techniques that are defined in software. It should be appreciated, however, that the functions necessary to implement the transceivers 102A-102B may alternatively be embodied in whole or in part using hardware or software or some combination thereof using signal processors, micro-controllers, microprocessors, or any other suitable hardware and/or software.

As described above, the 2:2 MIMO system 100 can be implemented as a non-line-of-sight (NLOS) system. When the system 100 is implemented as a NLOS system, the system has the following capabilities: (1) the capability of overcoming losses due to scattering objects and obstructions in the environment (also known as excess path loss), (2) the capability of mitigating signal fading, and (3) the capability of operating in dispersive channels. In the presently disclosed embodiment, the 2:2 MIMO system 100 overcomes excess path loss by providing a high system gain, which is achieved via the high power amplifiers 118-119, the low noise receivers 104A-104B, and the high gain antennas 106A-107A, 106B-107B (see FIG. 1). Further, the 2:2 MIMO system 100 mitigates signal fading, which generally accompanies the excess path loss, by employing a suitable space-time coding technique in combination with multiple diversity modes. Moreover, the 2:2 MIMO system 100 provides the capability of operating in a dispersive channel by employing orthogonal frequency division modulation (OFDM) to accommodate the level of dispersion in the channel and the channel dynamics.

In addition, the 2:2 MIMO system 100 implements an adaptive modulation technique to achieve increased data rates, and a spectrum management technique to obtain increased levels of data throughput and link availability. In the presently disclosed embodiment, the adaptive modulation technique operates by changing the modulation mode based on the signal-to-noise and distortion (SINAD) that would be available when operating in the next modulation level (step up or step down in modulation constellation). The spectrum management technique operates by measuring the interference on each channel, and determining the best channel available for transmission based on the channel interference measurements. The adaptive modulation and spectrum management techniques are described in detail below.

The 2:2 MIMO system 100 mitigates the fading of signals propagating along the four signal paths w, x, y, z (see FIG. 1) by employing space-time coding and multiple diversity modes. For example, the 2:2 MIMO system 100 can employ space-time block coding, layered space-time coding, space-time trellis coding, feedback space-time coding, spatial multiplexing space-time coding, or any other suitable type of space-time coding technique. The 2:2 MIMO system 100 employs a selected space-time coding technique in combination with multiple diversity modes, for example, spatial diversity, polarization diversity, and delay diversity, to achieve increased de-correlation of the four paths w, x, y, z.

Figure 2:
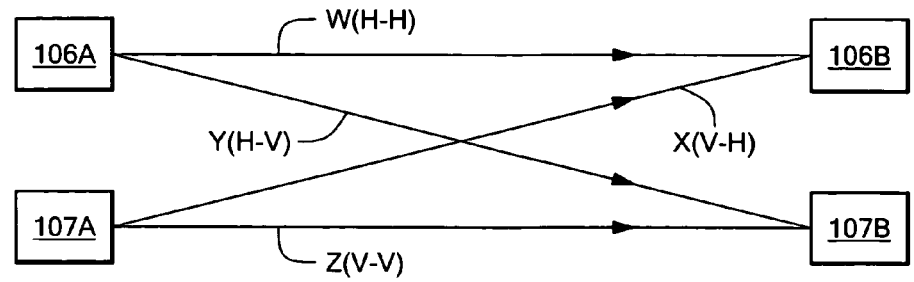
FIG. 2 is a diagram of a signal path configuration employed by the 2:2 MIMO wireless communications system of FIG. 1.

FIG. 2 depicts a simplified representation of the four signal paths w, x, y, z disposed between the antennas 106A-107A, 106B-107B of the 2:2 MIMO system 100 (see also FIG. 1). In the illustrated embodiment, each pair of antennas 106A-107A and 106B-107B has a predetermined spacing to provide spatial diversity. In addition, each one of the antennas 106A-106B is a horizontally polarized antenna, and each one of the antennas 107A-107B is a vertically polarized antenna, thereby providing polarization diversity. As a result, the signal path w is a horizontally polarized path, as indicated by the horizontal-to-horizontal (H-H) path designation, and the signal path z is a vertically polarized path, as indicated by the vertical-to-vertical (V-V) path designation. As described above, the communications link over which the signals are transmitted can be deployed in a high scattering environment including numerous scattering objects and obstructions. Such scattering of the transmitted signals causes polarization conversion to take place along the paths x, y, as indicated by the vertical-to-horizontal (V-H) and horizontal-to-vertical (H-V) path designations, respectively.

Because the 2:2 MIMO system 100 employs space-time coding techniques and spatial/polarization diversity to transmit signals over the communications link along the four signal paths w, x, y, z, the four paths w, x, y, z are highly de-correlated. As a result, the signals propagating along the respective paths w, x, y, z fade substantially independently. Those of ordinary skill in this art will appreciate that in NLOS communications, such signal fading typically fits a Rician distribution. It is noted, however, that when the excess path loss exceeds approximately 30 dB, the signal fading typically fits a Rayleigh distribution, in which the excess path loss is about 40 dB for 0.01% of the time.

A known technique for achieving transmit diversity is disclosed by S. M. Alamouti in "A Simple Transmit Diversity Technique for Wireless Communications", IEEE JSAC, October 1998 (the Alamouti reference), which is incorporated herein by reference. According to the Alamouti reference, two data symbols are transmitted in a predetermined combination by two transmitter antennas, and a receiver captures the transmitted signal via two receiver antennas and optimally combines the two data symbols. Consecutive data symbols can be optimally combined at the receiver to achieve four-way diversity along the signal paths between the transmitter and receiver antennas. The technique disclosed in the Alamouti reference is relatively complex, however, and generally requires substantial processing resources.

In the presently disclosed embodiment, the 2:2 MIMO system 100 employs delay diversity, along with the spatial and polarization diversity of the antenna configuration of FIG. 2, to obtain a high level of system performance while avoiding the complexities of the Alamouti technique. Such delay diversity is obtained by transmitting a signal via the antenna 106A, and then transmitting a delayed version of the signal via the antenna 107A. For example, the delay of the signal transmitted via the antenna 107A may be equal to about 1 msec or any other suitable delay time. Next, the maximum ratio combiner at the receiver (e.g., the receiver 104A or 104B; see FIG. 1) combines the signals propagating along the horizontally and vertically polarized paths w, z (the co-polar signals H-H, V-V), and combines the signals propagating along the paths x, y (the cross polar signals V-H, H-V) with the co-polar signals H-H, V-V at times when the co-polar signals H-H, V-V have faded without significant overall loss. The relative delay in the transmission of the signals via the antennas 106A-107A assures that these signals are substantially de-correlated and do not fade simultaneously across all frequencies. It is noted that when implementing delay diversity, greater channel dispersion may be allowable at the receiver. In addition, the selected space-time coding technique may include forward error correction (FEC) coding operative to assure that if a null is present in the frequency domain, then that null does not cause significant damage to the transmitted signal.

Although the co-polar signals H-H, V-V and the cross polar signals V-H, H-V are described above as corresponding to horizontally and vertically polarized signal paths, it should be understood that the co-polar and cross polar signals may alternatively correspond to any suitable linear or circular orthogonal polarizations. For example, the linear orthogonal polarizations may correspond to any suitable linear orthogonal angles, and the circular orthogonal polarizations may correspond to any suitable right hand circular and left hand circular orthogonal polarizations. It should also be understood that such linear or circular orthogonal polarizations may be only nominally orthogonal. For example, in the event horizontal and vertical linear orthogonal polarizations are employed, the linear orthogonal angles corresponding to the horizontal and vertical linear polarizations may be +30° and −60°, 0° and ±90°, 0° and ±80°, or any other suitable orthogonal or nominally orthogonal angles.

Figure 3:
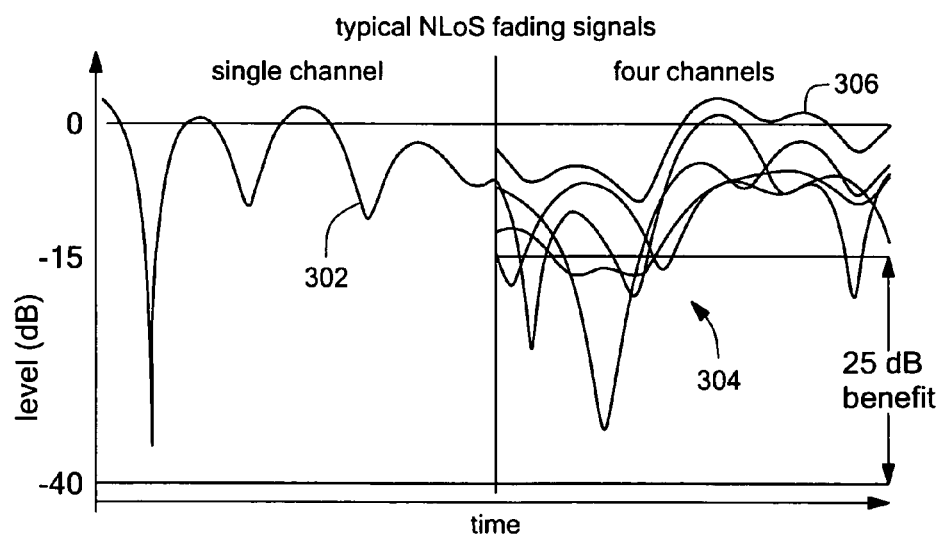
FIG. 3 is a diagram illustrating the non-line-of-sight (NLOS) fading of a signal transmitted over a respective one of the signal paths of FIG. 2, and the NLOS fading of a combination of four signals transmitted over respective ones of the signal paths of FIG. 2.

FIG. 3 illustrates the non-line-of-sight (NLOS) fading of a representative signal 302 transmitted over the communications link along a single path between the antennas 106a-107A and 106B-107B. The representative signal 302 has a 0.01% chance of fading 40 dB, and therefore the NLOS fading of the signal 302 fits a Rayleigh distribution. It is noted that the time scale corresponding to the signal 302 may range over a few seconds in a windy tree environment, or may range over a number of weeks in a high-rise concrete urban environment.

In addition, FIG. 3 illustrates the NLOS fading of four representative signals (generally indicated by reference numeral 304) transmitted over the link along the four signal paths w, x, y, z (see FIG. 2), and the NLOS fading of a combination of the four signals (indicated by reference numeral 306). It is understood that the four signals are transmitted over the link by the 2:2 MIMO system 100 (see FIG. 1), which employs space-time coding in combination with spatial diversity, polarization diversity, and delay diversity to achieve increased de-correlation of the four paths w, x, y, z. For example, the maximum ratio combiner at the receiver (e.g., the receiver 104A or 104B; see FIG. 1) may be used to combine the four signals 304 to obtain the combined signal 306. Whereas the representative signal 302 has a 0.01% chance of fading 40 dB, the representative combined signal 306 has a 0.01% chance of fading 15 dB.

Accordingly, transmitting the four signals 304 using the 2:2 MIMO system 100, and optimally combining the four signals 304 at the receiver to obtain the combined signal 306, provides a performance benefit of about 25 dB in the NLOS environment (see FIG. 3).

The 2:2 MIMO system 100 (see FIG. 1) reduces the level of channel dispersion by employing multiple carriers in an OFDM waveform and transmitting signals using the multiple carriers over multiple orthogonal channels. Because the carriers in the OFDM waveform are orthogonal to each other, multi-path interference and frequency selective fading are reduced. Further, because the fading of the transmitted signals is de-correlated, the system gain across the multiple orthogonal channels is increased. For example, the 2:2 MIMO system 100 may employ on the order of one thousand carriers or any other suitable number of carriers. It is noted that if the transceivers 102A-102B are implemented as software-defined radios, then the transmit modulator 110 can be configured to operate using OFDM waveforms defined in software, and the signal processor 126 can be configured to demodulate the OFDM waveforms using demodulation techniques defined in software.

As described above, the 2:2 MIMO system 100 provides for increased data rates in the presence of channel variability via an adaptive modulation technique. Specifically, the system 100 employs adaptive modulation to adjust the modulation mode to accommodate changes in the channel characteristics over time. The modulation mode may comprise one or more transmission parameters such as a modulation level, a coding rate, a symbol rate, a transmission power level, antenna directional parameters, space-time coding parameters, or any other suitable transmission parameter. For example, in the event a change in the channel characteristics increases the ratio of the signal-to-noise and distortion (SINAD), the modulation level can be increased or the coding rate can be decreased to obtain an increased data rate. Alternatively, in the event a change in the channel characteristics decreases the SINAD, the modulation level can be decreased or the coding rate can be increased to maintain an acceptable code word error rate.

Figure 4:
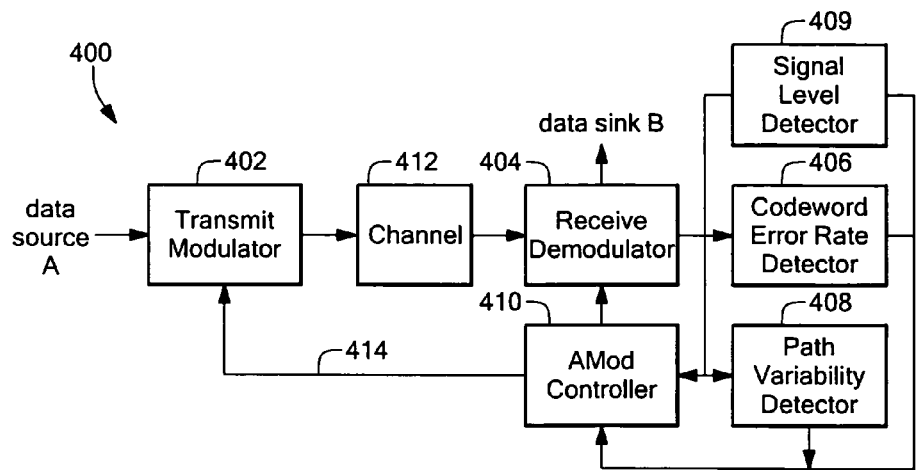
FIG. 4 is a block diagram of an adaptive modulation sub-system implemented within the 2:2 MIMO wireless communications system of FIG. 1.

FIG. 4 depicts an illustrative embodiment of an adaptive modulation sub-system 400 implemented within the 2:2 MIMO system 100 (see FIG. 1). As shown in FIG. 4, the adaptive modulation sub-system 400 includes a transmit modulator 402, a receive demodulator 404, a code word error rate detector 406, a signal path variability detector 408, a signal level detector 409, and an adaptive modulation controller 410. In the presently disclosed embodiment, the transmit modulator 402 generally corresponds to the transmit modulator 110 included in the transmitter 103A or 103B (see FIG. 1). It should be appreciated that the functions necessary to implement the receive demodulator 404, the code word error rate detector 406, the path variability detector 408, the signal level detector 409, and the adaptive modulation controller 410 may be embodied in whole or in part using hardware or software or some combination thereof using the signal processor 126 included in the receiver 104A or 104B (see FIG. 1). A representative channel 412 disposed between the transmit modulator 402 and the receive demodulator 404 corresponds to one of a plurality of orthogonal channels that may be employed by the system 100. It is noted that the adaptive modulation sub-system 400 is operative to adjust the modulation mode via feedback from the receiver 104A or 104B to the transmitter 103A or 103B over a signal path 414.

According to a first adaptive modulation technique, the sub-system 400 performs adaptive modulation while taking into account distortion that may result from complying with FCC (Federal Communications Commission) regulations limiting the maximum power output. For example, if the 2:2 MIMO system 100 were operated at its maximum power output, then the system may be subject to distortion due to the FCC regulations limiting the maximum power output to 1 watt. It is noted that the level of this distortion can be predetermined for each modulation mode, which may number from 3 to 10 modes.

In this first adaptive modulation technique, the receive demodulator 404 substantially continuously measures the signal-to-noise and distortion (SINAD) for the channel 412 to obtain a measurement vector error. Those of ordinary skill in this art will appreciate that the measurement vector error can be determined by calculating the RMS (root mean square) value of the spread of detected symbols (constellation points) around the ideal (unperturbed) value of that symbol. For example, when a modulated signal is transmitted over a communications link and then demodulated, the detected symbol values can spread about each constellation point due to the effects of noise and interference on the link. The measurement vector error can then be determined by taking the RMS value of the ideal modulation vectors minus the actual measured modulation vectors converted to a power and divided by the power in the overall signal. The adaptive modulation controller 410 subtracts the predetermined distortion corresponding to the modulation mode from the measurement vector error to obtain the environmental noise plus front end thermal noise. By subtracting the distortion from the measurement vector error, the adaptive modulation sub-system 400 can determine whether the system 100 will operate successfully in a next (e.g., higher) modulation level, even though a direct measurement of the signal-to-noise and distortion (SINAD) may indicate otherwise.

Figure 5:
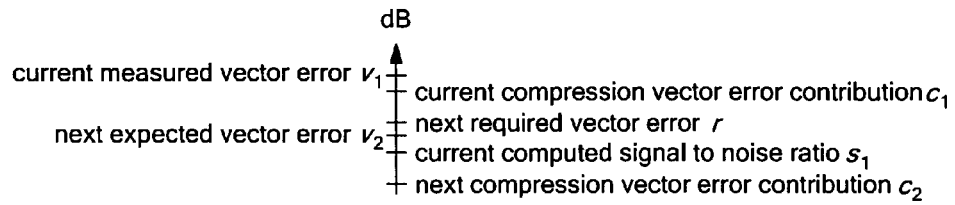
FIG. 5 is a diagram illustrating vector error measurements performed by the adaptive modulation sub-system of FIG. 4.

In one embodiment, the adaptive modulation controller 410 pre-computes the measurement vector error in accordance with the equation $$10^{v/10} = 10^{c/10} + 10^{s/10}, \tag{1}$$

in which "v" is the measurement vector error, "c" is the compression vector error contribution, and "s" is the computed signal-to-noise ratio. Specifically, the compression vector error contribution c is the vector error contribution that comes from the power amplifiers 118-119 (see FIG. 1) and/or the power limiters (not shown). The value of the compression vector error contribution c changes with the level of power output, and can be determined for the 2:2 MIMO system 100 by measurement or simulation. The computed signal-to-noise ratio s corresponds to the signal-to-noise ratio that would be available if there were no distortion in the power amplifiers 118-119 and/or the power limiters, and can be determined for the system 100 by measurement or simulation. FIG. 5 illustrates v, c, and s, along with the required vector error "r", which is the vector error required by the next modulation mode to achieve an acceptable error rate. Based on the pre-computed measurement vector error v, the adaptive modulation sub-system 400 can decide to change to the next modulation mode before the determination of the actual measurement vector error becomes available.

According to a second adaptive modulation technique, the adaptive modulation sub-system 400 performs adaptive modulation while taking into account the dynamics of the channel 412. Those of ordinary skill in this art will appreciate that signals transmitted over point-to-point NLOS channels typically fade at a rate that depends upon the level of wind and the movement of objects in the vicinity of the signal path. Such objects generally move at different rates, depending upon the stiffness of the objects, where the objects are located relative to the path, and the variability of the wind. In this second adaptive modulation technique, the adaptive modulation controller 410 continuously measures the dynamics of the channel 412 to assure that changes in the modulation mode are made before the signal undergoes significant fading. Specifically, the path variability detector 408 measures changes in the level of the signal over a predetermined interval corresponding to the time it takes to change the modulation mode. It is noted that to change the modulation mode, the adaptive modulation controller 410 requests a change in modulation via the signal path 414, and, after a time corresponding to the predetermined interval, the transmit modulator 402 makes the requested change. The path variability detector 408 then computes three times the standard deviation of 20, the signal level changes measured during the predetermined interval. In one embodiment, because the wind can vary in velocity over a period on the order of about 1 minute, measurements of the signal level changes are averaged over a period of about one minute, and three times the standard deviation of the averaged measurements is computed. This computation is used to establish a variable hysteresis that depends upon the dynamics of the channel 412.

Figure 6:
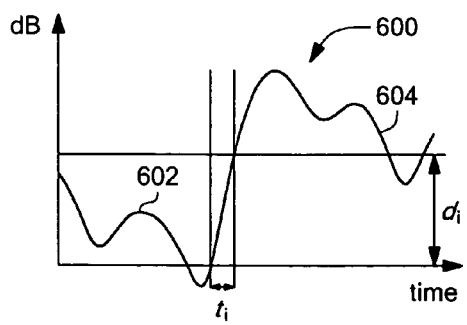
FIG. 6 is a diagram illustrating a measurement of the variability of a channel performed by the adaptive modulation sub-system of FIG. 4.

FIG. 6 illustrates the dynamics of the channel 412, specifically, the fading of a representative signal 600 transmitted over the channel 412. As shown in FIG. 6, the signal 600 includes a first portion 602 corresponding to a first modulation mode, and a second portion 604 corresponding to a second modulation mode. The time interval $t_i$ corresponds to the time it takes to change from the first modulation mode to the second modulation mode, and the change $d_i$ in the level of the signal 600 corresponds to the signal level change measured during the interval $t_i$.

This second adaptive modulation technique will be better understood with reference to the following illustrative example. In this example, a first modulation mode is defined by a modulation 16-QAM (quadrature amplitude modulation) and a FEC coding rate ½, and a second modulation mode is defined by a modulation QPSK (quadrature phase shift keying) and a FEC coding rate ⅔. The first modulation mode results in a value of 12 dB for the signal-to-noise and distortion (SINAD) required to achieve an acceptable error rate. When the first modulation mode changes to the second modulation mode, the SINAD value changes from 12 dB to 8 dB. The time interval $t_i$ that is takes to change from the first modulation mode to the second modulation mode is equal to 40 msec. Further, three times the standard deviation of $d_i$ is equal to 2 dB, which is used to establish the variable hysteresis when changing to the next modulation level (higher or lower). Accordingly, based on this second adaptive modulation technique, the modulation level would change to the next lower level at a SINAD value of $$12 \text{ dB} + 2 \text{ dB} = 14 \text{ dB}, \qquad (2)$$

in which "2 dB", which corresponds to three times the standard deviation of $d_i$, is the effective hysteresis. In contrast, the modulation level would change to the next higher level at a SINAD value of $$12 \text{ dB} + 2 \text{ dB} + 2 \text{ dB} = 16 \text{ dB}, \qquad (3)$$

in which each occurrence of "2 dB" corresponds to three times the standard deviation of $d_i$. In this case, an effective hysteresis of two times "2 dB" is employed because the signal level may change direction as soon as the adaptive modulation decision is made, causing two intervals $t_i$ to be required, i.e., one to change to the higher modulation level and one to change back to the lower modulation level.

According to a third adaptive modulation technique, the adaptive modulation sub-system 400 (see FIG. 4) performs adaptive modulation while taking into account interference that can result from operating in a shared frequency band. Error detection and correction schemes are particularly important in wireless communications systems operating in a shared frequency band, in which there is a high probability of interference from other users and radar. It should be appreciated that such an error correction scheme may be part of a forward error correction scheme (FEC), an automatic request for retransmission system (ARQ), the transport control protocol (TCP), or any other suitable error correction scheme. Because the characteristics of such interference are generally unknown, when error correction is working excessively hard the upper rates of adaptive modulation are limited to assure that the code word error rate does not exceed the error correcting capability of the error correction scheme. In the presently disclosed embodiment, the code word error rate detector 406 is operative to detect errors substantially as they occur in the code words. For example, in the event the code word error rate exceeds a predetermined maximum rate, thereby exceeding the error correcting capability of the error correction scheme, the adaptive modulation controller 410 can request a change in modulation from a first modulation mode defined by a modulation 16-QAM and a FEC coding rate ½, to a second modulation mode defined by a modulation QPSK and a FEC coding rate ⅔. This action may take place when the code word error rate detector 406 detects adjacent code word errors, which typically indicates that the code word error rate is greater than 1:1000 code words. In the event the code word error rate detector 406 determines that the code word error rate is less than 1:10000 when operating in the second modulation mode, it is assumed that the level of interference is sufficiently reduced, and the adaptive modulation sub-system 400 continues performing adaptive modulation using the first and second adaptive modulation techniques described above.

In addition to the above-described adaptive modulation techniques, the 2:2 MIMO system 100 (see FIG. 1) implements an adaptive power control technique, which controls the transmission power level based on the received signal level and the modulation mode. In the presently disclosed embodiment, the signal level detector 409 (see FIG. 4) is operative to determine the level of the received signal. In the event the received signal level is higher than that required for reliable reception, the transmission power level is reduced, thereby decreasing the level of interference for other users of the shared frequency band. It is noted that the adaptive modulation sub-system 400 is operative to adjust the transmission power level via feedback from the receiver 104A or 104B to the transmitter 103A or 103B over the signal path 414. In the preferred embodiment, the system 100 operates at a fixed transmission power level for each modulation mode until the highest modulation level is reached, thereby allowing the system to operate at the fastest possible data rate. While operating at the fastest data rate, the system 100 performs adaptive power control to assure that the received signal level remains constant. It is noted that the power margin applied to the received signal level should be sufficient to overcome the dynamics of the channel.

Figure 7:
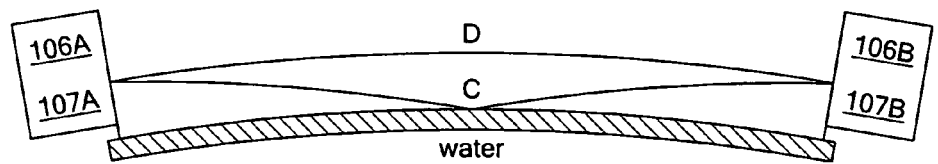
FIG. 7 is a diagram illustrating signals transmitted over a body of water along two signal paths from point A to point B by the 2:2 MIMO wireless communications system of FIG. 1, in which the 2:2 MIMO system is implemented as a line-of-sight (LOS) wireless communications system.

As described above, the 2:2 MIMO system 100 (see FIG. 1) can also be implemented as a line-of-sight (LOS) system. When the system 100 is implemented as a LOS system, the antennas 106A-107A, 106B-107B are configured to transmit signals propagating along two signal paths. FIG. 7 depicts a simplified representation of the two signal paths C-D disposed over a body of water between the antennas 106A-107A and 106B-107B, which are located at opposite ends of a communications link (not numbered). It is noted that the paths C-D are not straight, but are bending due to the change in refractive index of the air relative to the height above the water. Those of ordinary skill in this art will appreciate that when the antennas 106A-107A and 106B-107B are separated by significant geographical distances, the signals propagating along the paths C-D may be subject to water or ground reflection and atmospheric scintillation. As shown in FIG. 7, the signal propagating along the path C reflects off the body of water. In a conventional 2:2 MIMO system, the two signal paths C-D normally have a relatively high correlation. In the presently disclosed embodiment, the 2:2 MIMO system 100 reduces the correlation of the paths C-D by employing separate antennas at one end of the link.

Figure 8:
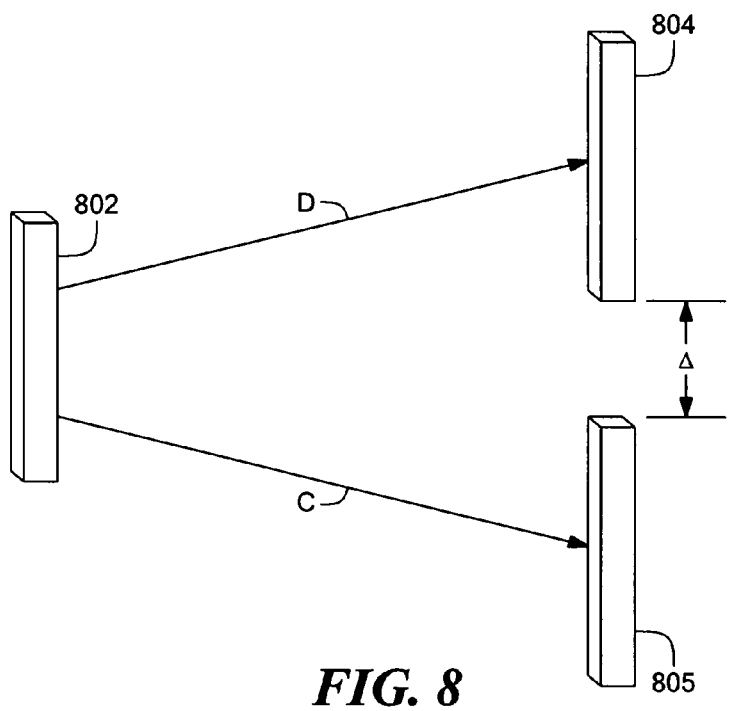
FIG. 8 is a block diagram of an antenna configuration employed in the LOS wireless communications system of FIG. 7, in which the antenna configuration includes a single dual polarized antenna disposed at point A, and two vertically separated and horizontally and vertically polarized antennas disposed at point B.

Specifically, when implemented as a LOS system, the two antennas 106A-107A are configured as a single dual polarized antenna 802 (see FIG. 8), and the two antennas 106B-107B are configured as separate horizontally and vertically polarized antennas 804-805 (see FIG. 8), respectively. As shown in FIG. 8, the antennas 804-805 are deployed at different heights, and are therefore separated by a predetermined distance Δ. Such an antenna configuration provides both polarization and spatial diversity, thereby assuring de-correlation of the signal paths C-D (see FIG. 7). In the preferred embodiment, the 2:2 MIMO system 100 employs space-time coding and polarization and spatial diversity to minimize water/ground bounce nulls. For example, the antenna 802 can be unobtrusively mounted on a building, and the antennas 804-805 can be mounted on a mast or any other suitable elevated structure.

Figure 9A:
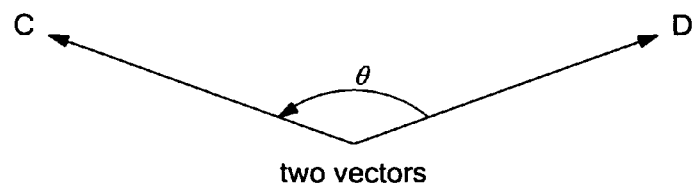
FIGS. 9a-9b are vector diagrams of the sum of the two signals received at point B of FIG. 7.
Figure 9B:
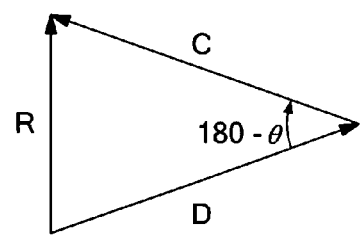

As shown in FIG. 7, the signal propagating along the signal path C reflects off the body of water. It is noted that the reflected signal has substantially the same amplitude as the signal propagating along the signal path D, which does not undergo reflection. The signal received by the antennas 106B-107B comprises the vector sum of the signals propagating along the respective paths C-D. FIG. 9a illustrates the two signal vectors C-D, and FIG. 9b illustrates how these signal vectors C-D add together. As illustrated in FIGS. 9a-9b, the signal vectors C-D are conceptually separated by an angle θ.

Figure 10:
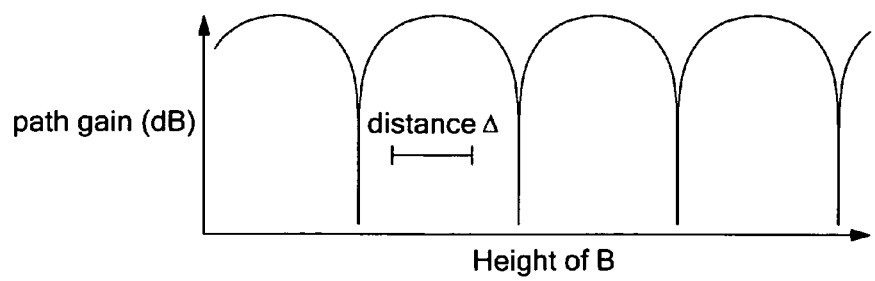
FIG. 10 is a diagram of the resultant variations in the amplitude of the signals received by the antennas at point B of FIG. 8 versus the height of the antennas.

FIG. 10 illustrates the variation in amplitude of the vector sum of the signals received by the antennas 106B-107B relative to the height of the antennas 106B-107B. If the angle θ separating the signal vectors C-D (see FIGS. 9a-9b) were constant with time, then the antennas 106B-107B might be located at a height where θ is equal to 0 to maximize the vector sum. In a practical implementation, however, the effective lengths of the signal paths C-D (see also FIG. 7) can vary relative to one another, and therefore simply locating the antennas 106B-107B at the height where θ=0 may not provide the maximum vector sum for all time. For example, such variations in the effective signal path lengths may be caused by variations in the level of the water or ground, and/or variations in the refractive index of the air. In the presently disclosed embodiment, the antennas 106B-107B are located at different heights, and the receiver (e.g., the receiver 104B; see FIG. 1) is configured to capture the maximum sum of the signal vectors C-D. In the preferred embodiment, the distance Δ separating the antennas 804-805 (see FIG. 8) is chosen to correspond to n plus one half the distance between successive troughs, in which n can take non-negative integer values 0, 1, 2, 3, etc. In the presently disclosed MIMO system, the gain of this arrangement is achieved in both directions, and therefore the transmitter may be on separated antennas and the receiver may be on a single dual polarized antenna. Further information relating to the optimum spacing of receiver antennas for minimizing water/ground bounce nulls and for reducing signal fading due to atmospheric scintillation is disclosed in International Telecommunications Union (ITU) recommendation ITU-R P.530, which is incorporated herein by reference.

The 2:2 MIMO system 100 (see FIG. 1) implements a spectrum management technique to obtain increased levels of data throughput and link availability. In the presently disclosed embodiment, the spectrum management technique includes measuring the level of noise and interference on each frequency channel, and then determining the best channel available for transmission based on the channel noise/interference measurements. In general, the system 100 either instantaneously works or does not work, depending upon the level of the signal to noise ratio at the receiver (e.g., the receiver 104A or 104B; see FIG. 1). In the preferred embodiment, the system 100 performs automatic retransmission request (ARQ) operations, causing the overall transmission to be about 1:1000000 packet error rate. It is noted that the level of noise and interference in the transmission environment can vary from a high mean noise/interference level to a low mean noise/interference level, but significantly high spikes of noise may also be present due to radar. In one embodiment, the spectrum management technique makes multiple noise/interference measurements for each channel, generates a histogram for each channel using the noise/interference measurements, determines the 99.9 percentile for each channel, and selects the channel with the lowest 99.9 percentile (corresponding to the lowest level of noise/interference) as the best channel available for transmission. It should be appreciated that the functions necessary to implement the spectrum management technique may be embodied in whole or in part using hardware or software or some combination thereof using the signal processor 126 included in the receiver 104A or 104B (see FIG. 1).

Figure 11:
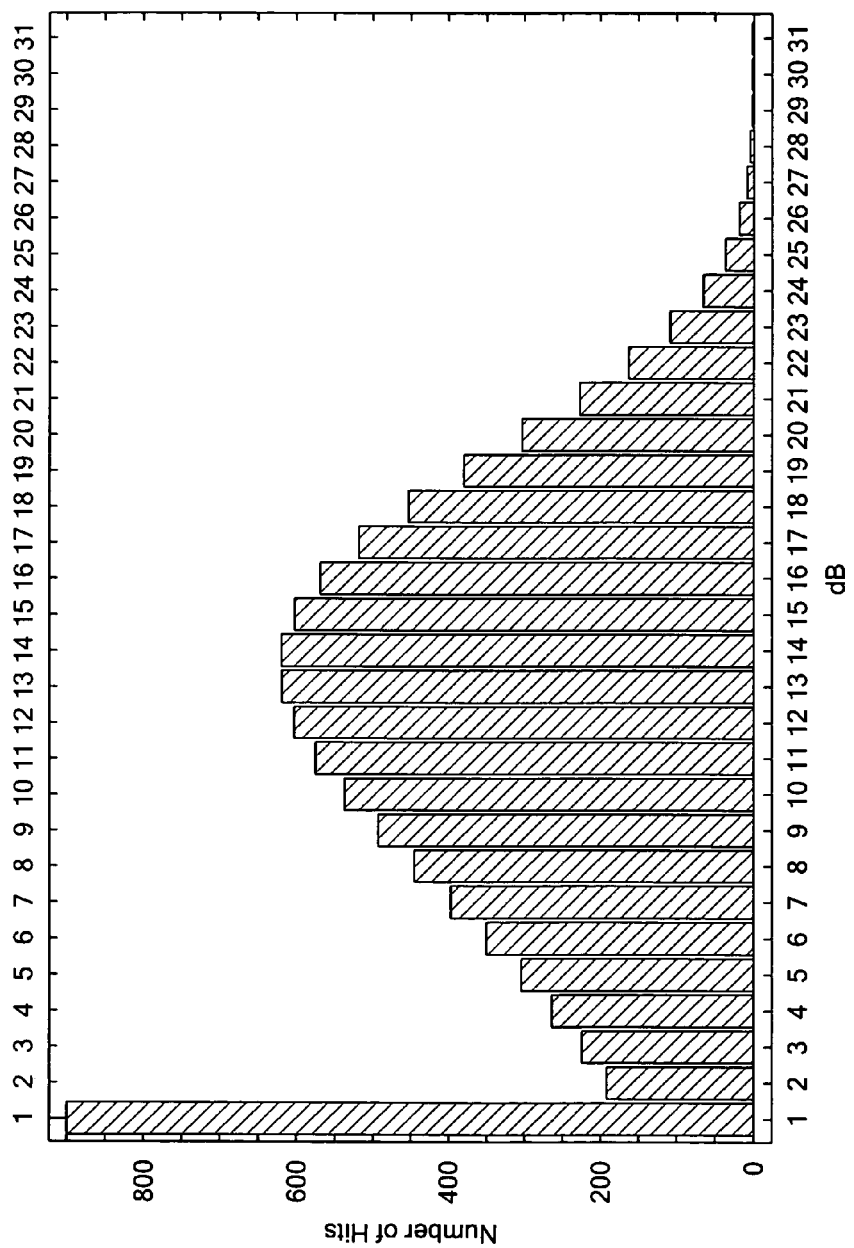
FIG. 11 is a diagram of an illustrative histogram that can be employed for determining a noise/interference level estimate for a representative channel in the 2:2 MIMO wireless communications system of FIG. 1.

FIG. 11 depicts a diagram illustrating a histogram generated using representative noise/interference measurements for an exemplary frequency channel. As shown in FIG. 11, the illustrative histogram includes a plurality of bins, in which each bin corresponds to a predetermined range of noise and interference levels (e.g., 1 dB) associated with the respective channel. Further, the numbers along the horizontal axis of the diagram correspond to the number of decibels above the thermal noise level for the receiver, and the numbers along the vertical axis correspond to the number of samples. To find the 99.9 percentile point for this illustrative histogram, all of the samples are added together to obtain a total number of samples "N". The number N is then multiplied by 0.999 to obtain a value "N999". Finally, the number of samples in each bin are counted until the value N999 is exceeded. Using this procedure, the 99.9 percentile point of the illustrative histogram of FIG. 11 is determined to be about 26 dB.

Figure 12A:
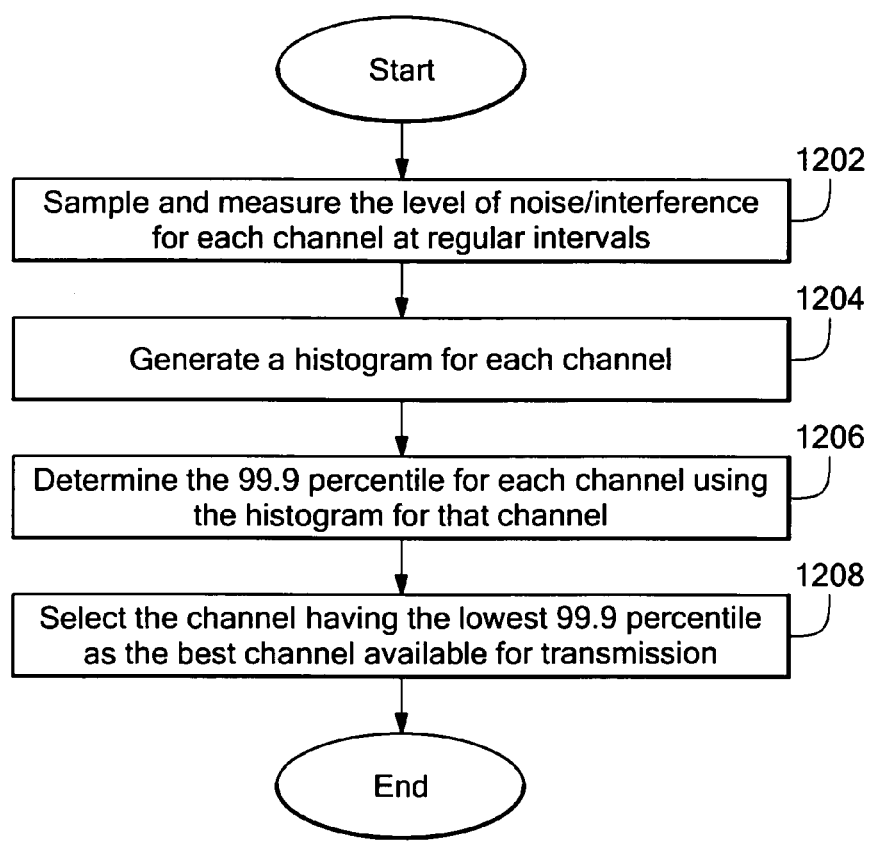
FIGS. 12a-12b are flow diagrams illustrating methods of spectrum management performed by the 2:2 MIMO wireless communications system of FIG. 1.

A first spectrum management technique is illustrated by reference to FIG. 12a. As depicted in step 1202, the level of noise/interference for each frequency channel is sampled and measured at regular intervals using any suitable technique. For example, the 2:2 MIMO system 100 (see FIG. 1) can regularly sample each channel at times between signal transmission and reception, i.e., when the transmitter 103A or 103B and the receiver 104A or 104B (see FIG. 1) are substantially inactive. Next, a histogram is generated for each channel by collecting the noise/interference level measurements into bins (e.g., 1 dB bins), as depicted in step 1204. A predetermined percentile for each channel, preferably, the 99.9 percentile, is then determined using the histogram for that channel, as depicted in step 1206. Finally, the channel having the lowest 99.9 percentile, i.e., the lowest level of noise/interference, is selected as the best channel available for transmission, as depicted in step 1208. In the preferred embodiment, the spectrum management technique employs an averaging time of about 20 minutes and a hysteresis of about 2 dB to assure that the system 100 is not continuously selecting a new frequency channel for transmission.

Figure 12B:
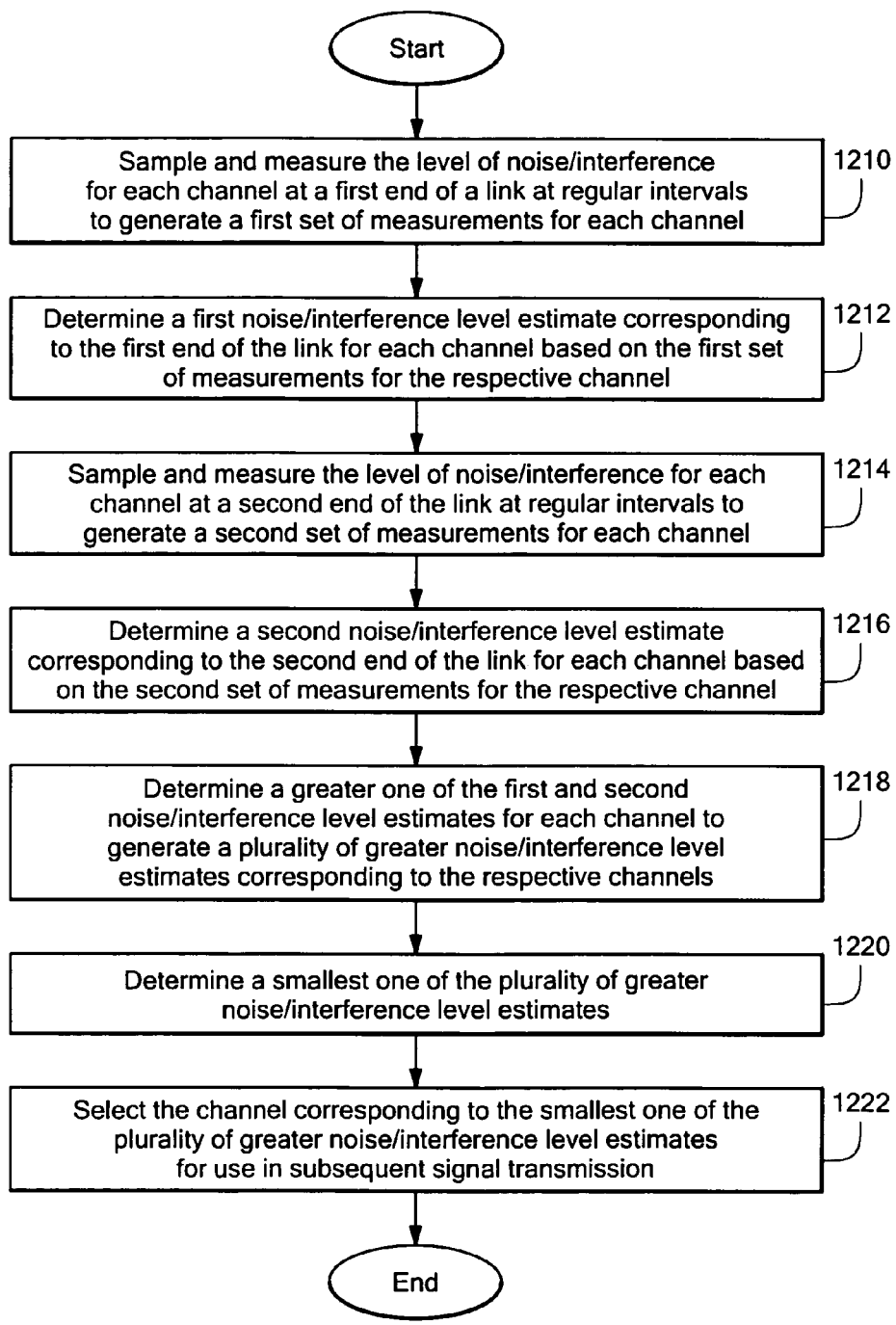

A second spectrum management technique is illustrated by reference to FIG. 12b. As depicted in step 1210, the level of noise/interference for each frequency channel is sampled and measured at regular intervals at a first end of a communications link using any suitable technique, thereby generating a first set of measurements for each channel. Next, a first noise and interference level estimate corresponding to the first end of the link for each channel is determined based on the first set of measurements for the respective channel, as depicted in step 1212. As depicted in step 1214, the level of noise/interference for each frequency channel is sampled and measured at regular intervals at a second end of the link using any suitable technique, thereby generating a second set of measurements for each channel. Next, a second noise and interference level estimate corresponding to the second end of the link for each channel is determined based on the second set of measurements for the respective channel, as depicted in step 1216. A greater one of the first and second noise and interference level estimates is then determined for each channel, thereby generating a plurality of greater noise and interference level estimates corresponding to the respective channels, as depicted in step 1218. Next, a smallest one of the plurality of greater noise and interference level estimates is determined, as depicted in step 1220. Finally, the channel corresponding to the smallest one of the plurality of greater noise and interference level estimates is selected for use in subsequent signal transmission, as depicted in step 1222. It is understood that in this second spectrum management technique, the first and second noise and interference level estimates corresponding to the first and second ends of the link, respectively, for each channel can be determined via suitable histograms, as illustrated in the first spectrum management technique of FIG. 12a.

For example, if the first and second noise and interference level estimates corresponding to the first and second ends of a communications link, respectively, for a first channel are determined to be about −90 dB and −80 dB, and the first and second is noise and interference level estimates corresponding to the first and second ends of the link, respectively, for a second channel are determined to be about −85 dB and −83 dB, then the greater noise and interference level estimates for the first and second channels would be −80 dB and −83 dB, respectively. Because the smaller one of these greater noise and interference level estimates is −83 dB, the second channel is selected for subsequent use in signal transmission.

Figure 13:
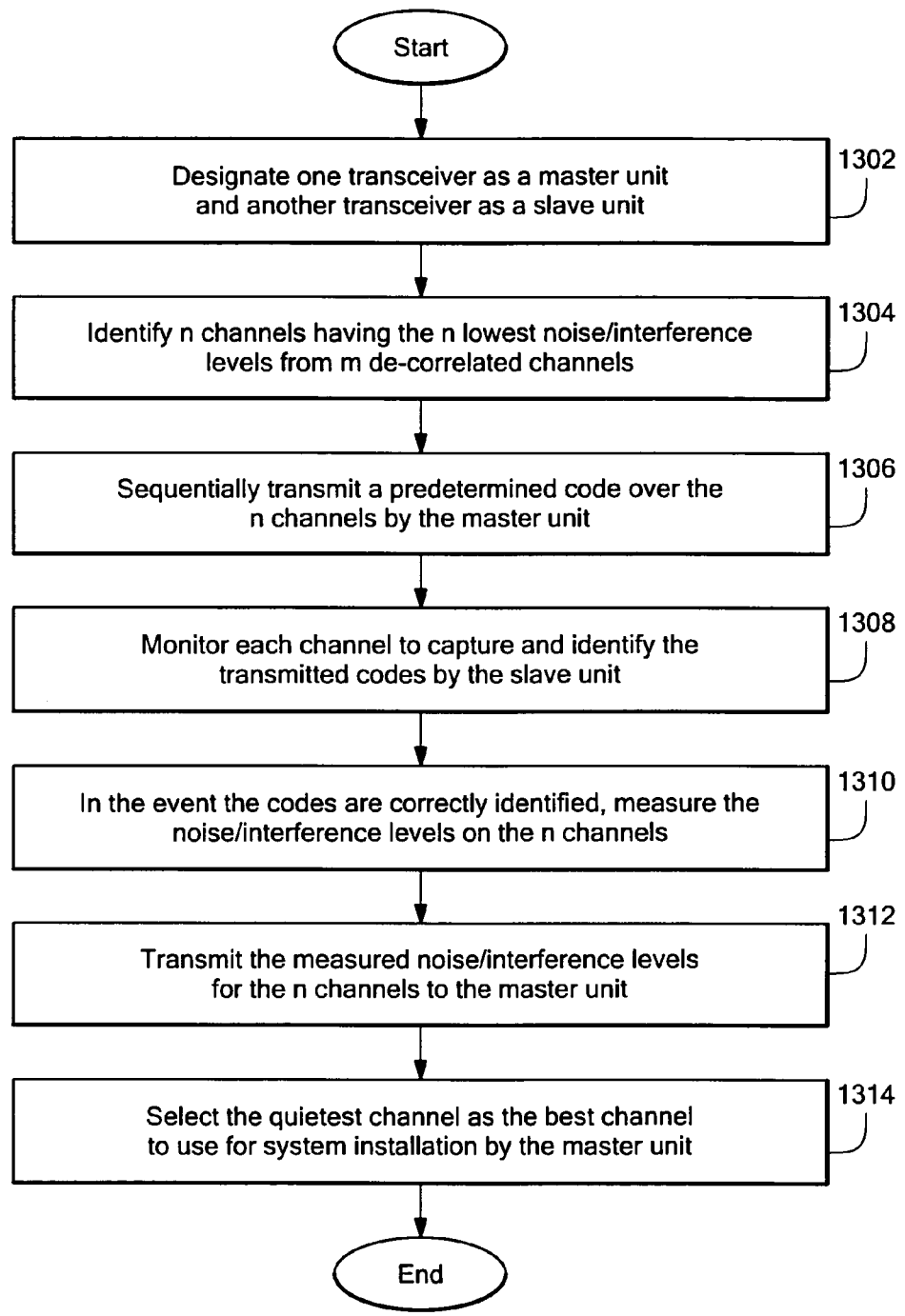
FIG. 13 is a flow diagram illustrating a method of installing the 2:2 MIMO wireless communications system of FIG. 1.

The above-described spectrum management techniques can be used to facilitate installation of the 2:2 MIMO system 100 by determining the best channel available for performing the installation. This is particularly useful when operating the system 100 in a shared frequency band. As shown in FIG. 13, system installation begins by designating one of the transceivers 102A-102B (see FIG. 1) as a master unit and designating the other transceiver as a slave unit, as depicted in step 1302. It is understood that each one of the master and slave units comprises a transceiver like the transceivers 102A-102B of FIG. 1. Next, the master unit employs spectrum management to identify n (n>1; e.g., n=3) channels having the n lowest noise/interference levels from a total of m (m>n) de-correlated channels, as depicted in step 1304. The master unit then sequentially transmits a predetermined code over the n identified channels, as depicted in step 1306. The master unit transmits the predetermined code over the n channels having the n lowest noise/interference levels because the slave unit may detect a relatively high level of noise/interference on the channel determined to be the quietest (i.e., the channel having the least noise/interference) at the master unit location. In one embodiment, the predetermined code is generated by inputting the MAC address of the master unit to a Hash function to obtain a pseudo-random code. Next, the slave unit monitors each frequency channel to capture and identify the codes transmitted by the master unit, as depicted in step 1308. In the event the slave unit correctly identifies the predetermined code transmitted by the master unit over the n channels, the slave unit measures the noise/interference levels on the n channels, as depicted in step 1310. The slave unit then transmits the measured noise/interference levels for the n channels to the master unit, as depicted in step 1312. Finally, the master unit selects the quietest channel as the best channel to use for the installation, as depicted in step 1314. In an alternative embodiment, the slave unit selects the quietest channel as the best channel available for installation, and commences communication with the master unit on that channel.

In one embodiment, the master unit employs multiple carriers including pilot carriers and data carriers in an OFDM waveform when transmitting the predetermined code to the slave unit over the n frequency channels. It is noted that each pilot carrier is like the carrier employed in amplitude modulation (AM) or the suppressed carrier employed in single sideband (SSB) operation. The pilot carriers provide a phase reference for the data carriers to increase the accuracy of signal demodulation by the slave unit. In one embodiment, the signal transmitted over each pilot carrier has a cyclic prefix of one complete OFDM symbol. Further, the phase of each pilot signal corresponds to the Fourier transform of a chirp signal. As such, the pilot signals do not add substantially to the peak excursion of the transmitted signals. The signal transmitted over each data carrier contains the predetermined code. In one embodiment, the phase of each data signal is BPSK modulated with the result of hashing the MAC address of the master unit. The slave unit recovers the timing of the signals by performing a sliding correlation of multiple samples, in which each sample corresponds to one OFDM symbol length. This correlation yields a peak value when the timing is correct. The frequency offset is proportional to the phase of the correlation times the spacing of the multiple carriers.

For example, the number of carriers in the OFDM waveform can be equal to 1024. Further, one in sixteen of the carriers can be designated as pilot carriers, while the remaining carriers are designated as data carriers. In one embodiment, validation of the slave unit for communication with the master unit is accomplished by counting the number of data signals containing the predetermined code that are correctly demodulated by the slave unit. To that end, the master unit can count the number of noise/interference measurements for each corresponding channel provided by the slave unit. When using an OFDM waveform having on the order of about 900 data carriers, the slave unit must correctly demodulate only about 60% of the data signals to determine the validity of the slave unit with a probability of 1:1000. This can be achieved with a relatively low signal to noise ratio, e.g., as low as −5 dB.

To further facilitate installation of the 2:2 MIMO system 100, the audio tone generator 130 included in the receiver 104A or 104B of the master unit produces an audio tone based on whether or not the slave unit correctly identifies the predetermined code transmitted by the master unit. In the presently disclosed embodiment, the audio tone generator 130 produces an audio tone that is slowly stuttered when the slave unit fails to identify the predetermined code. A slowly stuttered tone is defined herein as a tone that is periodically turned "on" for 2 seconds and then turned "off" for 0.5 seconds. Such slow stuttering of the audio tone is employed because human operators (installers) typically cannot distinguish changes in frequency when faster stuttering is used. When the slave unit succeeds in correctly identifying the predetermined code, the slave unit measures the level of noise/interference on the corresponding channel and provides the noise/interference measurement to the master unit. Because this noise/interference measurement indicates to the master unit that the slave unit has correctly identified the predetermined code, the audio tone generator 130 of the master unit produces a substantially continuous tone.

Figure 14:
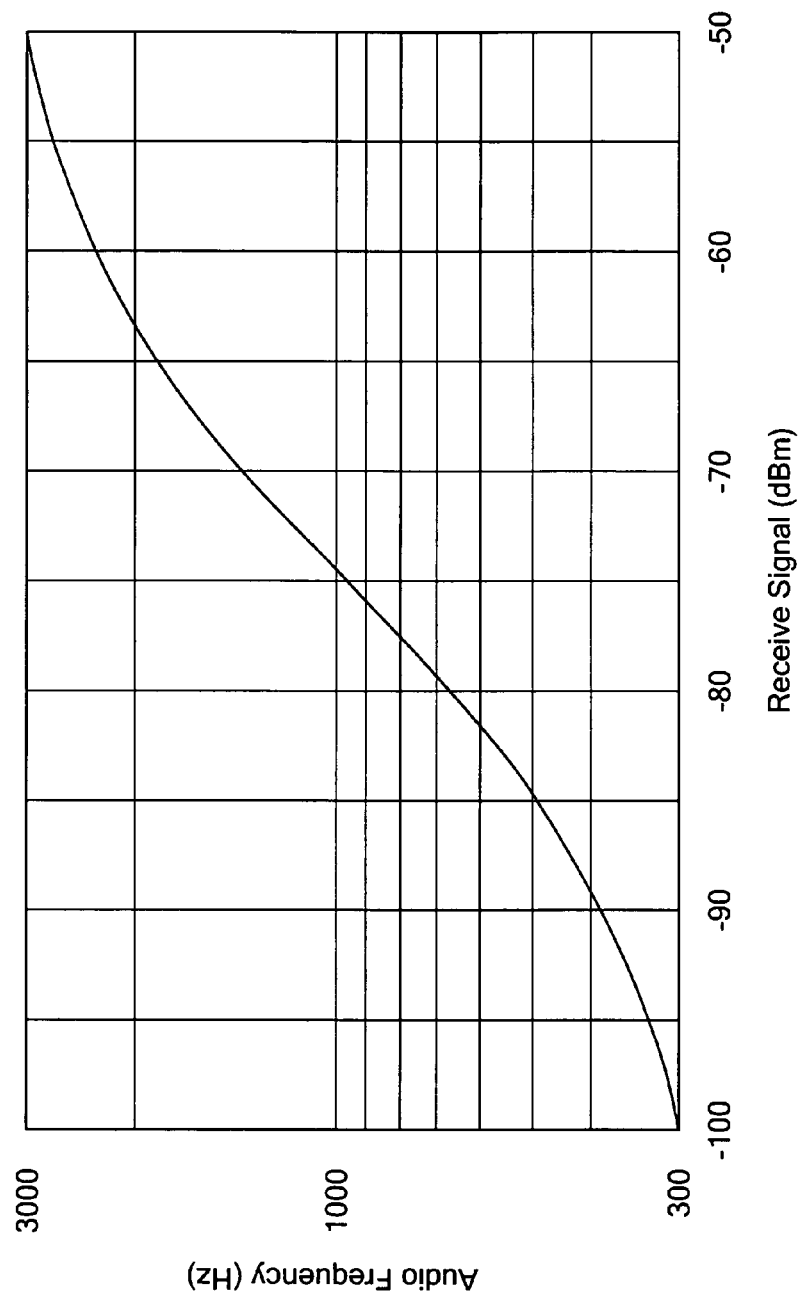
FIG. 14 is a diagram illustrating an audio transfer characteristic of an audio tone employed in the installation of the 2:2 MIMO wireless communications system of FIG. 1.

A representative audio transfer characteristic for such a continuous tone is illustrated in FIG. 14. It is noted that the audio transfer characteristic of FIG. 14 can be approximated by three substantially linear segments, specifically, a first segment ranging from about (−100 dBm, 300 Hz) to (−80 dBm, 600 Hz), a second segment ranging from about (−80 dBm, 600 Hz) to (−65 dBm, 2000 Hz), and a third segment ranging from about (−65 dBm, 2000 Hz) to (−50 dBm, 3000 Hz). As a result, the majority of the tonal frequency change (i.e., octaves) is within the receive signal level change area for creating a reliable link.

Because the master and slave units are typically housed in sealed electronics enclosures, an opening 132 (see FIG. 1) is provided through which the sound produced by the audio tone generator 130 can emanate. In an alternative embodiment, the audio tone generator 130 may include an adapter 134 configured for connection to a headphone device 136 that can be positioned near one or both of the installer's ears. By providing the audio tone to the installer via the headphone device 136, the tone can be more easily heard in the presence of high levels of ambient noise produced by, e.g., automobiles and/or airplanes.

Figure 15:
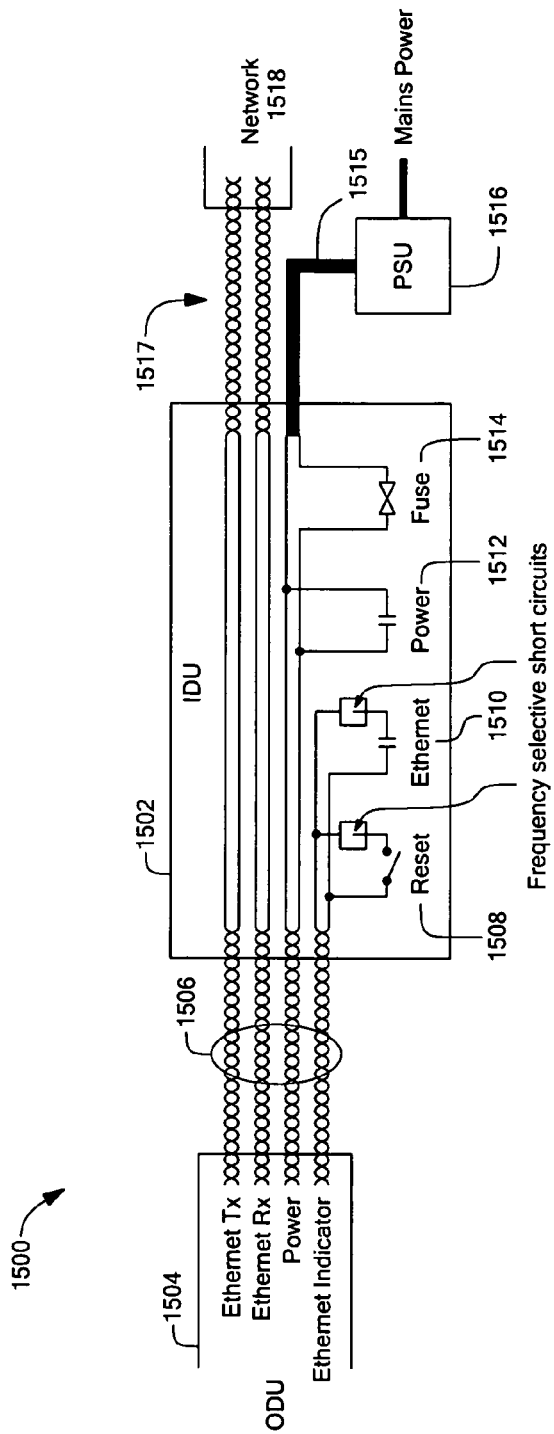
FIG. 15 is a block diagram of an illustrative practical implementation of the 2:2 MIMO wireless communications system of FIG. 1, including an Ethernet LED and a reset switch employed in the installation of the 2:2 MIMO system.

As indicated above, the master and slave units, particularly, the transceivers 102A-102B of the 2:2 MIMO system 100 (see FIG. 1), are typically housed in respective electronics enclosures. In the preferred embodiment, the electronics enclosure 1500 of each one of the transceivers 102A-102B comprises an indoor unit (IDU) 1502 and an outdoor unit (ODU) 1504, which may be mounted on a mast (see FIG. 15). The ODU 1504 includes the active electronics of the transceiver 102A or 102B and the corresponding antennas 106A-107A or 106B-107B. The IDU 1502 includes an Ethernet indicator LED 1510, a power indicator LED 1512, a fuse 1514, and a reset switch 1508. As shown in FIG. 15, the IDU 1502 is connected to the ODU 1504 via a cable 1506 such as a CAT 5 Ethernet cable having four pairs of cores, which are used for Ethernet data (Ethernet Tx and Rx), Power, Reset, and the Ethernet indicator. The IDU 1502 is also connectable to a LAN or router 1518 via a cable 1517 such as a 100baseT compatible cable, and a power supply unit (PSU) 1516 via a cable 1515.

In the presently disclosed embodiment, the reset switch 1508 and the Ethernet LED 1510 operate using frequency selective short circuits (see FIG. 15). For example, the frequency selective short circuits corresponding to the reset switch 1508 and the Ethernet LED 1510 may be responsive to AC frequencies 1.5 MHz and 50 kHz, respectively. Further, the presence or absence of the 50 kHz frequency can be used to drive the Ethernet LED 1510, and the 1.5 MHz frequency can be used to detect a short circuit for the reset switch 1508 by detecting a load on that frequency. In this way, the functionality of the reset switch 1508 and the Ethernet LED 1510 can be achieved with essentially no active electronics. The Ethernet LED 1510 can be used to indicate the status of the cable 1506 between the IDU 1502 and the ODU 1504 by indicating the current status of system operation. For example, the Ethernet LED 1510 may blink at regular intervals for a given period of time to indicate that the system software has successfully loaded, and may blink at irregular intervals to indicate the presence of Ethernet data (Ethernet Tx and Rx). In addition, the reset switch 1508 can be used to restore default settings when reinstalling the system in a new location or to reset IP address information.

Figure 16:
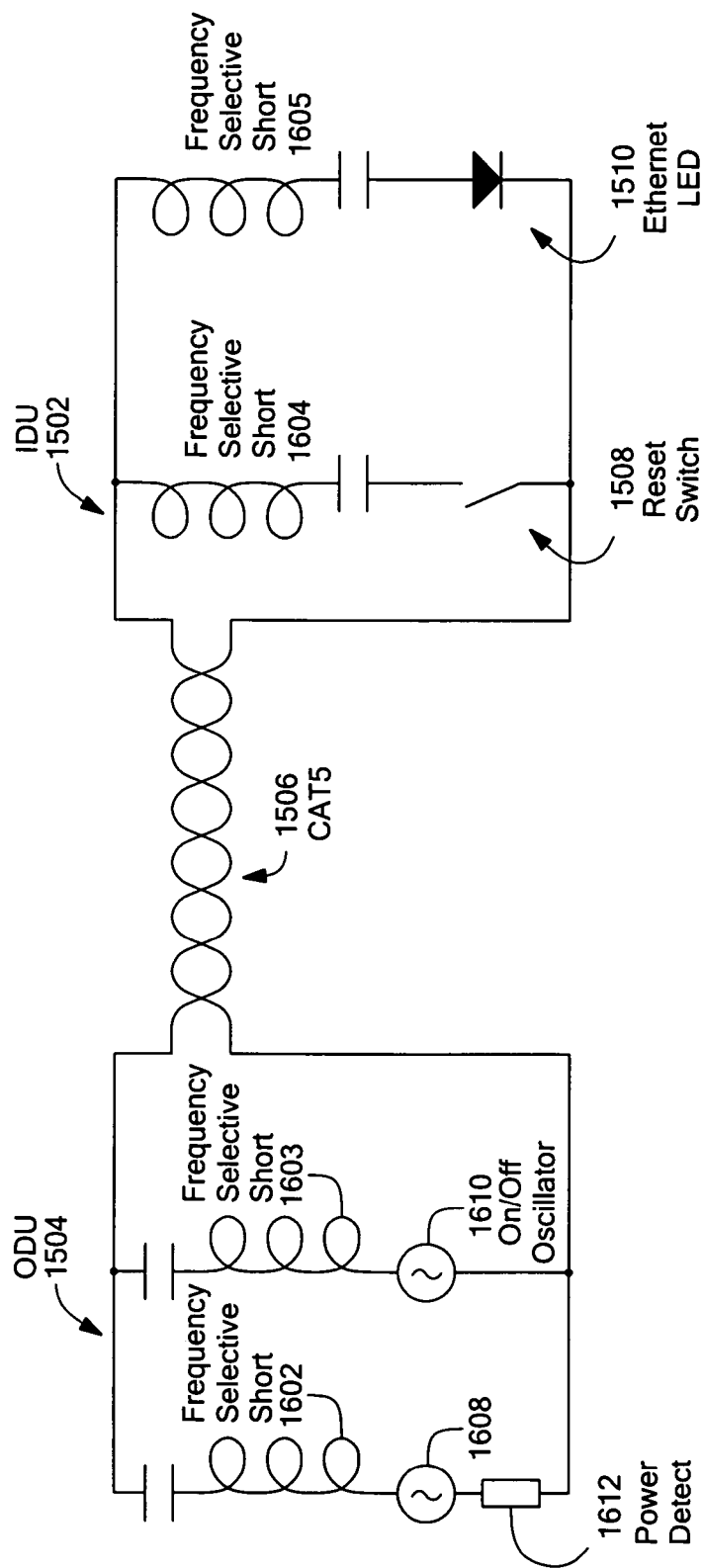
FIG. 16 is a schematic diagram of illustrative circuitry associated with the Ethernet LED and the reset switch of FIG. 15.

FIG. 16 depicts the frequency selective short circuits corresponding to the reset switch 1508 and the Ethernet LED 1510. As shown in FIG. 16, frequency selective short circuits 1602-1603 are disposed in the outdoor unit (ODU) 1504, and frequency selective short circuits 1604-1605 are disposed in the indoor unit (IDU) 1502. Each of the frequency selective short circuits 1602-1605 comprise a capacitor serially connected to an inductor. The IDU 1502 further includes the reset switch 1508 and the Ethernet LED 1510, and the ODU 1504 further includes first and second oscillators 1608, 1610, and a power detect load 1612 such as a resistive load. In the preferred embodiment, the first oscillator 1608 is a 1.5 MHz oscillator, and the second oscillator 1610 is a 50 kHz oscillator. When the reset switch 1508 is actuated, the 1.5 MHz frequency provided by the oscillator 1608 is used to detect power in the power detect load 1612. In addition, the presence and absence of the 50 kHz frequency provided by the oscillator 1610 causes a current to flow through the Ethernet LED 1510.

Figure 17:
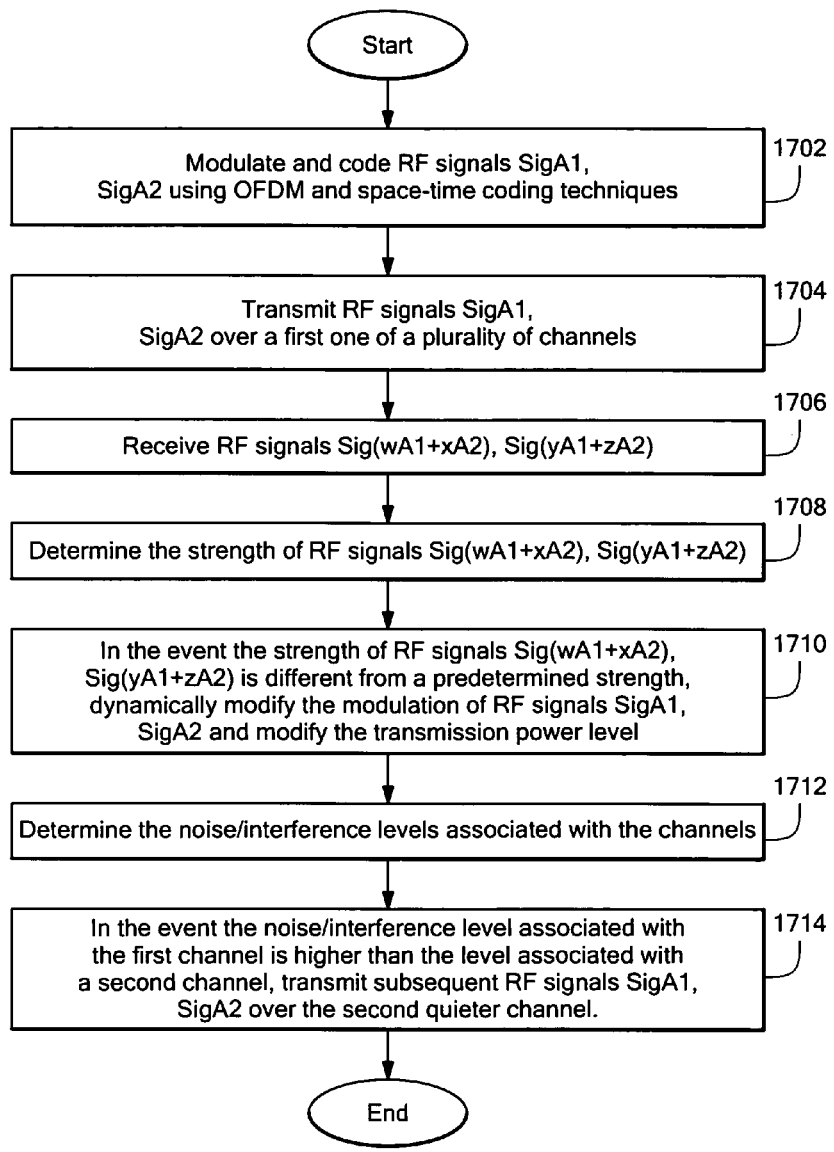
FIG. 17 is a flow diagram of a method of operating the 2:2 MIMO wireless communications system of FIG. 1.

A method of operating the 2:2 MIMO system 100 is illustrated with reference to FIGS. 1 and 17. As depicted in step 1702, a plurality of RF signals SigA1, SigA2 is modulated and coded using OFDM and space-time coding techniques by the transmitter 103A. Next, the RF signals SigA1, SigA2 are transmitted, as depicted in step 1704, over a first one of a plurality of channels by the transmitter 103A via the antennas 106A-107A, which comprise horizontally and vertically polarized antennas, respectively. The transmitted signals SigA1, SigA2 propagate along the signal paths w, z as co-polar signals and along the signal paths x, y as cross polar signals, thereby causing signals Sig(wA1+xA2), Sig(yA1+zA2) to be received by the receiver 104B, as depicted in step 1706. Next, the receiver 104B determines the strength of the received signals Sig(wA1+xA2), Sig(yA1+zA2), as depicted in step 1708. In the event the strength of the signals Sig(wA1+xA2), Sig(yA1+zA2) is determined to be different from a predetermined acceptable signal strength, the modulation of the RF signals SigA1, SigA2 is dynamically modified by an adaptive modulation technique to increase the probability of reliable detection of the signals by the receiver 104B, as depicted in step 1710. In addition, the transmission power level is modified by an adaptive power control technique based on the received signal strength and the modulation mode, as also depicted in step 1710. Next, noise/interference levels associated with the plurality of channels are determined by a spectrum management technique, as depicted in step 1712. In the event the noise/interference level associated with the first channel is higher than the noise/interference level associated with a second one of the channels, subsequent RF signals SigA1, SigA2 are transmitted over the second quieter channel by the transmitter 103A for subsequent receipt by the receiver 104B, as depicted in step 1714. As shown in FIG. 1, RF signals SigB1, SigB2 can also be transmitted by the transmitter 103B to propagate along the signal paths w, z as co-polar signals and along the signal paths x, y as cross polar signals, thereby causing signals Sig(wB1+xB2), Sig(yB1+zB2) to be received by the receiver 104A.

It will further be appreciated by those of ordinary skill in the art that modifications to and variations of the above-described multiple input multiple output (MIMO) wireless communications system may be made without departing from the inventive concepts disclosed herein. Accordingly, the invention should not be viewed as limited except as by the scope and spirit of the appended claims.

What is claimed is:

1. A multiple input multiple output (MIMO) wireless communications system, comprising:
   a first transceiver;
   at least one first antenna operatively connected to the first transceiver,
   wherein the first transceiver and the first antenna are operable to transmit and receive signals propagating along at least one signal path using at least one coding and modulation scheme;
   a second transceiver; and
   at least one second antenna operatively connected to the second transceiver,
   wherein the second transceiver and the second antenna are operable to transmit and receive signals propagating along the at least one signal path using the at least one coding and modulation scheme,
   wherein each of the first and second antennas comprises a respective dual polarized antenna including first and second co-located antenna elements operating at different polarizations, and
   wherein the first and second co-located antenna elements are operable to transmit first and second signals, respectively, a selected one of the first and second signals being a delayed version of another one of the first and second signals.

2. The system of claim 1 wherein the first and second co-located antenna elements operate at substantially orthogonal polarizations.

3. The system of claim 2 wherein the first and second co-located antenna elements operate at linear orthogonal polarizations.

4. The system of claim 2 wherein the first and second co-located antenna elements operate at circular orthogonal polarizations.

5. The system of claim 1 wherein a selected one of the first and second co-located antenna elements operates at a horizontal polarization, and another one of the first and second co-located antenna elements operates at a vertical polarization.

6. The system of claim 1 wherein the at least one signal path comprises a plurality of signal paths, wherein the first transceiver and the first antenna are operable to transmit and receive at least one co-polar signal and at least one cross polar signal propagating along respective ones of the plurality of signal paths, and wherein the second transceiver and the second antenna are operable to transmit and receive at least one co-polar signal and at least one cross polar signal propagating along the respective ones of the plurality of signal paths.

7. The system of claim 6 wherein each of the first and second transceivers includes a maximum ratio combiner operable to optimally combine the cross polar signals with the co-polar signals.

8. The system of claim 1 wherein the at least one coding and modulation scheme includes a space-time coding technique.

9. The system of claim 1 wherein the at least one coding and modulation scheme includes an orthogonal frequency division modulation (OFDM) technique.

10. A multiple input multiple output (MIMO) wireless communications system, comprising:
    a first transceiver;
    at least one first antenna operatively connected to the first transceiver,
    wherein the first transceiver and the at least one first antenna are operable to transmit and receive signals propagating along at least one signal path using at least one coding and modulation scheme;
    a second transceiver; and
    at least one second antenna operatively connected to the second transceiver,
    wherein the second transceiver and the at least one second antenna are operable to transmit and receive signals propagating along the at least one signal path using the at least one coding and modulation scheme,
    wherein a selected one of the first and second antennas comprises a respective dual polarized antenna including first and second co-located antenna elements operating at different polarizations, and another one of the first and second antennas comprises first and second spatially separated antenna elements operating at different polarizations, and
    wherein each of the first and second antennas is configured to provide signal delay diversity.

11. The system of claim 10 wherein the first and second spatially separated antenna elements have a predetermined spatial separation.

12. The system of claim 11 wherein the predetermined spatial separation of the first and second spatially separated antenna elements corresponds to n plus one half of a distance between successive troughs of a received signal, and wherein n is a non-negative integer value.

13. The system of claim 10 wherein the first and second spatially separated antenna elements operate at substantially orthogonal polarizations.

14. The system of claim 13 wherein the first and second spatially separated antenna elements operate at linear orthogonal polarizations.

15. The system of claim 13 wherein the first and second spatially separated antenna elements operate at circular orthogonal polarizations.

16. The system of claim 10 wherein a selected one of the first and second spatially separated antenna elements operates at a horizontal polarization, and another one of the first and second co-located antenna elements operates at a vertical polarization.

17. The system of claim 10 wherein the first and second co-located antenna elements operate at substantially orthogonal polarizations.

18. The system of claim 17 wherein the first and second co-located antenna elements operate at linear orthogonal polarizations.

19. The system of claim 17 wherein the first and second co-located antenna elements operate at circular orthogonal polarizations.

20. The system of claim 10 wherein a selected one of the first and second co-located antenna elements operates at a horizontal polarization, and another one of the first and second co-located antenna elements operates at a vertical polarization.

21. The system of claim 10 wherein the at least one signal path comprises a plurality of signal paths, wherein the first transceiver and the first antenna are operable to transmit and receive at least one co-polar signal and at least one cross polar signal propagating along respective ones of the plurality of signal paths, and wherein the second transceiver and the second antenna are operable to transmit and receive at least one co-polar signal and at least one cross polar signal propagating along the respective ones of the plurality of signal paths.

22. The system of claim 21 wherein each of the first and second transceivers includes a maximum ratio combiner operable to optimally combine the cross polar signals with the co-polar signals.

23. The system of claim 10 wherein the at least one coding and modulation scheme includes a space-time coding technique.

24. The system of claim 10 wherein the at least one coding and modulation scheme includes an orthogonal frequency division modulation (OFDM) technique.

* * * * *